United States Patent [19]
Baba et al.

[11] 4,298,891
[45] Nov. 3, 1981

[54] TELEVISION RECEIVER

[75] Inventors: Takaaki Baba, Nishinomiya; Takayuki Sagishima, Suita; Teruo Kitani, Takatsuki; Reiichi Sasaki, Yawata, all of Japan

[73] Assignee: Matsushita Electric Industrial Co., Ltd., Osaka, Japan

[21] Appl. No.: 49,637

[22] Filed: Jun. 18, 1979

[30] Foreign Application Priority Data

Jun. 19, 1978 [JP] Japan ................................. 53-74462

[51] Int. Cl.³ ............................................. H04N 5/22
[52] U.S. Cl. .................................................... 358/183
[58] Field of Search ............................... 358/183, 142

[56] References Cited
U.S. PATENT DOCUMENTS 4,070,695 1/1978 Scholz et al. ......................... 358/183
4,139,860 2/1979 Micic et al. .......................... 358/183

Primary Examiner—Richard Murray
Attorney, Agent, or Firm—Wenderoth, Lind & Ponack

[57] ABSTRACT

A television receiver including: television signal receiving means for simultaneously receiving two different television signals to produce two different image signals, a first and a second image signal corresponding to the television signals; synchronous signal producing means for producing vertical synchronous signals and horizontal synchronous signals from the two image signals; memory means for sampling and storing the second image signal; driving pulse producing means for producing driving pulses to drive the memory means in accordance with the synchronous signals supplied to the driving pulse producing means from the synchronous signal producing means; mixing means for producing a mixed image signal by inserting, into the first image signal under the control of the driving pulses, the second image signal read out from the memory means by the driving pulses; and display means for displaying the output of the mixing means; wherein the second image signal of each horizontal synchronous period is sampled by the memory means into $N_H$ sampled signals, and n sampled signals which are sampled from n adjacent horizontal lines of the second image signal, respectively, and which correspond to each other in vertical direction on a TV screen are summed and integrated into one sampled image signal element whereby $N_H$ sampled image signal elements for one horizontal synchronous period upon read-out are formed from $n \times N_H$ sampled signals of n adjacent horizontal lines and stored by the memory means.

Since the information of all of the n adjacent horizontal lines is utilized for the displayed image, the displayed image can be of high quality.

3 Claims, 27 Drawing Figures

TELEVISION RECEIVER

BACKGROUND OF THE INVENTION

This invention relates to a television receiver wherein in a main picture of one channel of the television receiver, a sub-picture supplied by a different channel or the same channel can be inserted at the same time.

SUMMARY OF THE INVENTION

It is an object of this invention to improve the image quality of the sub-image over that of the corresponding conventional system.

This object is achieved according to this invention by providing a television receiver comprising: television signal receiving means for simultaneously receiving two television signals to produce a first image signal and a second image signal corresponding to said television signals, respectively, each of which contains vertical synchronous signals and horizontal synchronous signals; synchronous signal producing means operatively coupled to said television signal receiving means for producing the vertical synchronous signals and the horizontal synchronous signals from said first and second image signals; memory means operatively coupled to said television signal receiving means for sampling and storing said second image signal; driving pulse producing means operatively coupled to said synchronous signal producing means and to said memory means for producing driving pulses to drive said memory means in accordance with said vertical synchronous signals and said horizontal synchronous signals applied thereto; mixing means operatively coupled to said television signal producing means and to said memory means for producing a mixed image signal composed of said first image signal having a portion of which replaced, under the control of said driving pulses, by said second signal read out from said memory means by said driving pulses; and display means operatively coupled to said mixing means for displaying said mixed image signal on a television screen, wherein: each horizontal synchronous period of said second image signal is sampled by said memory means into $N_H$ sampled signals, $N_H$ being an integer; M horizontal synchronous periods of said second image signal are sequentially grouped into M/n sequential groups, each group consisting of n horizontal synchronous periods, M and n being integers, and M>n; and n sampled signals which are sampled by said memory means from each of said group of n adjacent horizontal synchronous periods of said second image signal, respectively, and which correspond to each other in the vertical direction on the television screen are summed and integrated into one sampled image signal element, whereby $N_H$ such sampled image signal elements for each horizontal synchronous period of the second image signal in said mixed image signal are formed from $n \times N_H$ sampled signals of each of said group of n adjacent horizontal synchronous periods of said second image signal and stored by said memory means.

According to a further development of this invention, said memory means comprises: a first set of $N_H$ charge transfer devices, a second set of $N_H$ charge transfer devices, a third set of $N_H \times N_v$ charge transfer devices, a fourth set of $N_H$ charge transfer devices, a fifth set of $N_H$ charge transfer devices and a sixth set of $N_H \times N_v$ charge transfer devices, $N_v$ being equal to $M/(2n)$ and which equals the number of horizontal synchronous periods of one field of said second image signal in said mixed image signal, wherein: for a first field of one frame of said second image signal from said television signal receiving means, each horizontal synchronous period of said second image signal is sampled by said first set of devices into said $N_H$ sampled signals; the n sampled signals which are sampled by said first set of devices from each of said group of n adjacent horizontal synchronous periods of said second image signals, respectively, and which correspond to each other in said vertical direction are summed and integrated into said one sampled image signal element by each corresponding one of said $N_H$ charge transfer devices of said second set of devices; and said $N_H$ such sampled image signal elements are stored in corresponding $N_H$ charge transfer devices of said third set of devices, and wherein: for a second field of said one frame of said second image signal from said television signal receiving means, the sampling operation, the summing-integrating operation are and the storing operation the same as those performed by said first set of devices, second set and third set for said first field, respectively, and are performed by said fourth set, fifth set and sixth set, of devices respectively.

According to a still further development of this invention, each of said charge transfer devices is a charge coupled device. Hereinafter, this invention will be described in detail in comparison with the prior art.

DESCRIPTION OF THE PREFERRED EMBODIMENT

Figure 1A:
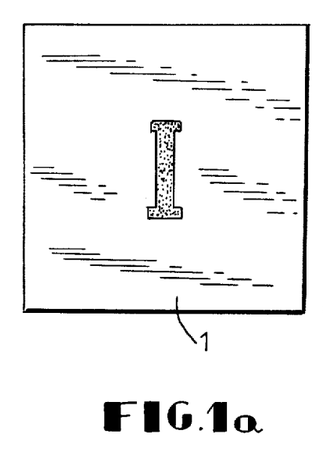
FIGS. 1a–1d are schematic views of a TV screen used to explain the operation of the present invention.
Figure 1B:
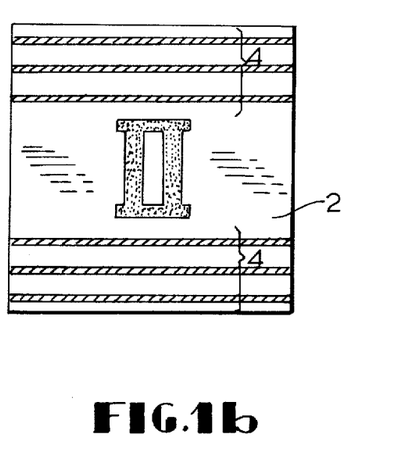

FIGS. 1a ∝ 1d are schematic views of a TV screen to show the effect of displaying two independent pictures for different I and II channels on a same screen: picture 1 from the channel I, and picture 2 from the channel II. In the case when the 1 for I channel and the picture 2 for II channel are such as shown in FIGS. 1(a) and 1(b), respectively, a mixed picture 3 shown in FIG. 1(c) can be obtained by compressing the display lengths of picture 2 to ⅓ of the original lengths in both the vertical and horizontal directions. A method for displaying such a picture 3 is known from the Japanese Published Unexamined Patent Application (Kokai) No. 49-2419/1974. According to the basic concept of the known method, the display principle is as follows. First picture elements on a horizontal line signal are sampled and stored in memories (that is, a writing operation), and then picture elements on the subsequent two horizontal line signals are not stored in the memories. Such serial motions are repeated for a period equal to three horizontal synchronous intervals (3H). The contents of the memories are read out in accordance with the period of every horizontal synchronous interval (H) by a read-out rate of three times the sampling rate for the writing operation when the horizontal scanning for the I channel sweeps the area 5 shown in FIG. 1 (c).

Figure 1C:
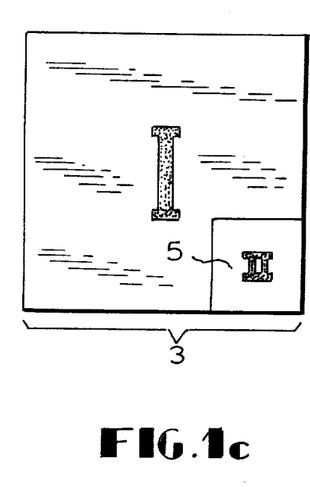
Figure 1D:
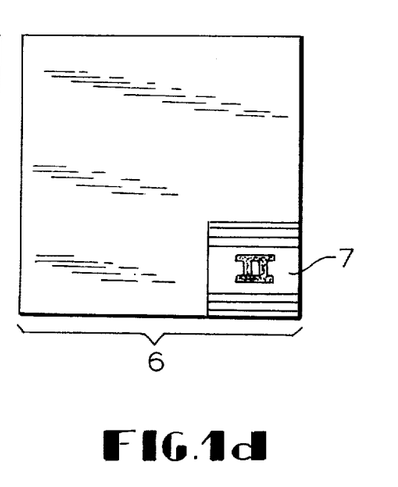

The known displaying method described above has the following disadvantageous points. For an example, consider a picture which includes stripe patterns 4 whose duration intervals for black levels are nearly equal to the sampling intervals with respect to horizontal direction, that is 3H. Under such a condition, the stripe patterns 4 are not sampled and stored in the memories in accordance with certain conditions for the conventional writing operation. As a result, an inserted picture 5 does not have any information for the stripe patterns 4.

The aim of this invention is to realize a inserted picture 7, for example, with information for the stripe patterns 4. The concept to realize this is shown in FIGS. 2a–2b.

Figure 2A:
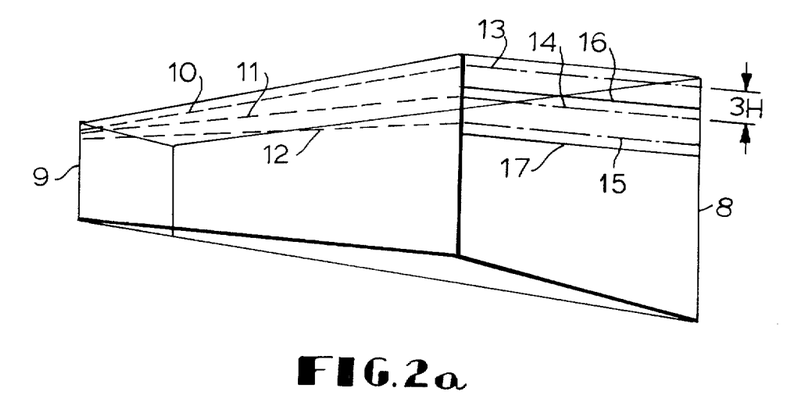
FIGS. 2a–2b are views of the writing operation of a conventional TV receiver and a TV receiver in accordance with the present invention.

FIG. 2 (a) shows the concept for the conventional writing operation. A square 8 denotes the whole picture information for the channel II. The square 9 denotes the sub-picture (sub-image) information in the mixed picture 3 (See FIG. 10). The broken lines 10 to 12 denote the signal transport of the sampled signals by using the functions of the memories. The one-dot chain lines 13 to 15 denote sampling states on a selected horizontal line signal. The sampling states repeat with a period of 3H in FIG. 2a. Solid lines 16, 17 denote stripe patterns 4 in FIG. 1 (b). As shown in FIG. 2 (a) it is apparent that the information for the stripe patterns 16, 17 are not transported into the sub-picture information 9.

Figure 2B:
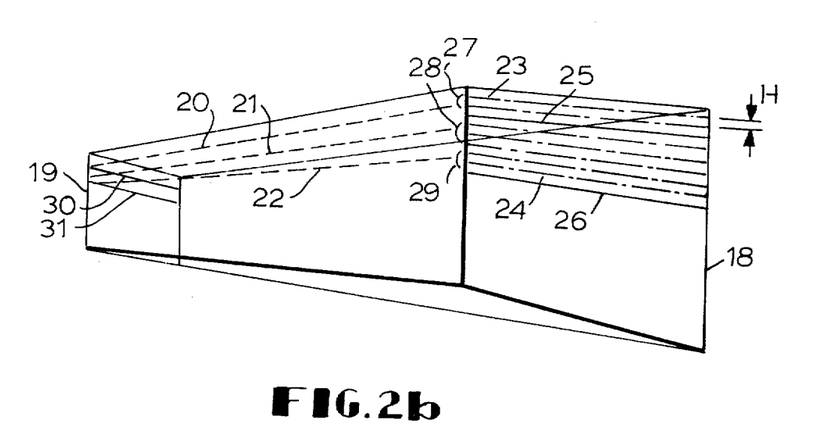

Comparing with the above operation, FIG. 2 (b) shows the concepts to realize this invention. The square 18 denotes the whole picture information for the channel II. The square denotes the sub-picture information inserted into the mixed picture 6. The broken lines 20 to 22 denote the signal transport of the sampled signals by using the function of the memories. The one-dot chain lines that continue from the designation 23 to the designation 24 with a period of every horizontal line (H), are the sampling states on a horizontal line. Solid lines 25, 26 show stripe patterns 4 in FIG. 1 (b). Reference designations 27 to 29 indicate a function to sum and integrate three corresponding picture elements on respectively different horizontal line signals over the interval of 3H (in this Figure). From such an arrangement as shown in FIG. 2 (b) is is apparent that the information 30, 31 for the stripe patterns 4 can be transported into the sub-picture information 19. In other words, it is a feature of this invention to sample every horizontal line signal and to sum and integrate the signals over the interval of nH (where n is an integer number and where n=3 in this example) and to transport the signals by using the function of the memories. Thus, picture quality for the stripe patterns, for example, which repeat in the vertical direction, can be improved.

Figure 3:
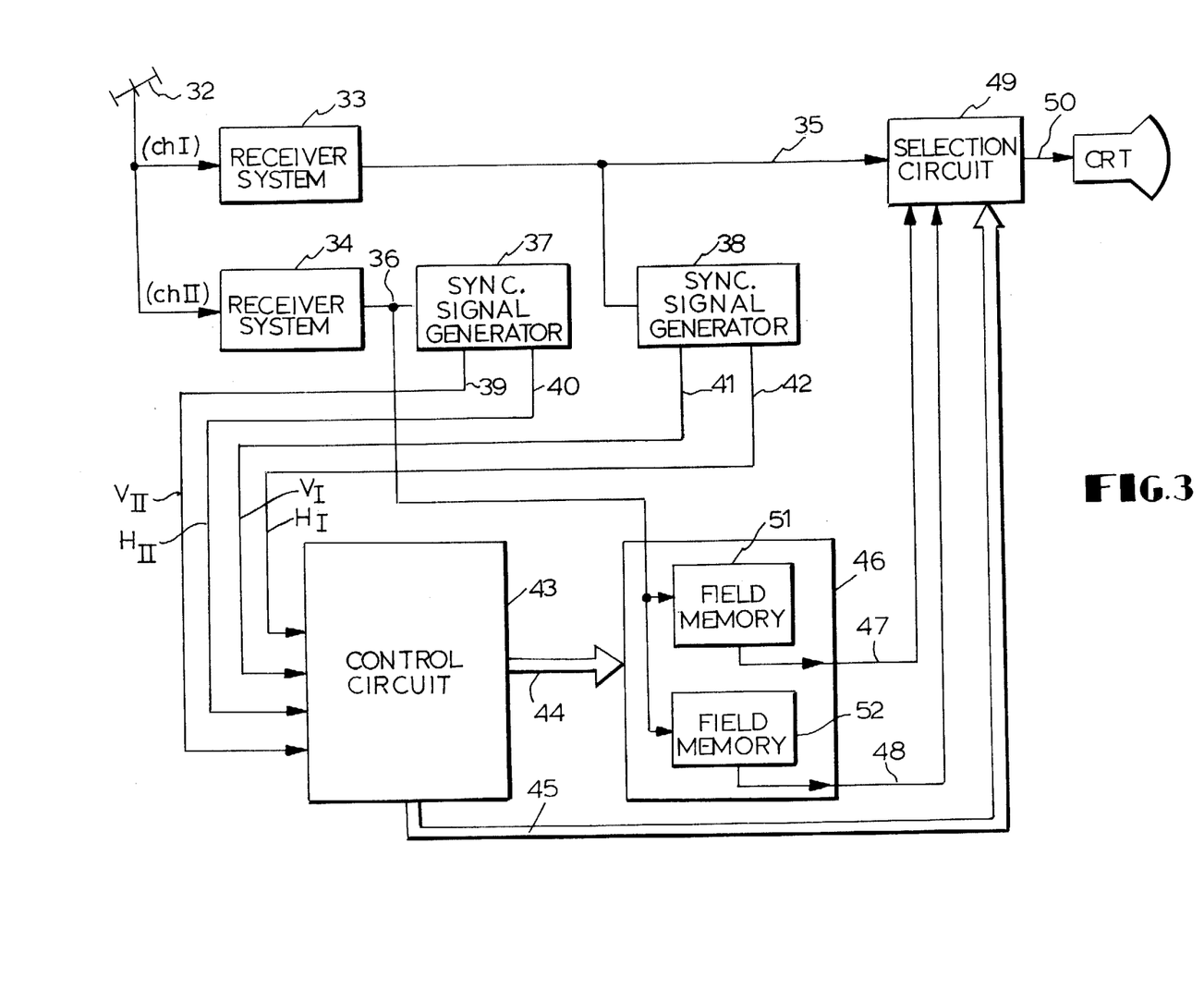
FIG. 3 is a block diagram of a TV receiver in accordance with the present invention.

FIG. 3 shows an example of the specific configuration of the invention, in which reference numeral 32 designates an antenna, and 33, 34 are receiver systems I and II respectively composed of tuners, video intermediate frequency amplifiers, video detectors and video amplifiers for producing a video signal (image signal) 35 for channel I and a video signal 36 for channel II. 37 Designation is a circuit for producing a vertical synchronous or synchronizing signal $V_{II}$ 39 and horizontal chronous or synchronizing signal $H_{II}$ 40 for the channel II. Designation 38 is a circuit for producing a vertical synchronizing signal $V_I$ 41 and horizontal synchronizing signal $H_I$ 42 for the channel I. Reference numeral 43 is a control circuit, receiving the synchronizing signals $V_I$, $H_I$, $V_{II}$, $H_{II}$ as inputs, and producing a group 44 of timing pulses. Reference numeral 46 is a memory system, and realizes the writing and reading-out operations and the sum and integration operations, which is a basic principle of this invention, by receiving the video signal 36 as an input. The memory system 46 is composed of two field memories 51, 52. Selection circuit 49 mixes stored video signals 47, 48, (which are supplied from the memories 51, 52 during the reading-out operation), with the video signals 35 for channel I utilizing receiving control signal 45 for this mixing. Mixed video signal 50 corresponds to the mixed image shown in FIG. 1(d).

The detailed configuration of the field memories 51, 52 and the group 44 of timing pulses are described for the purpose of clarifying the features of this invention.

Figure 4A:
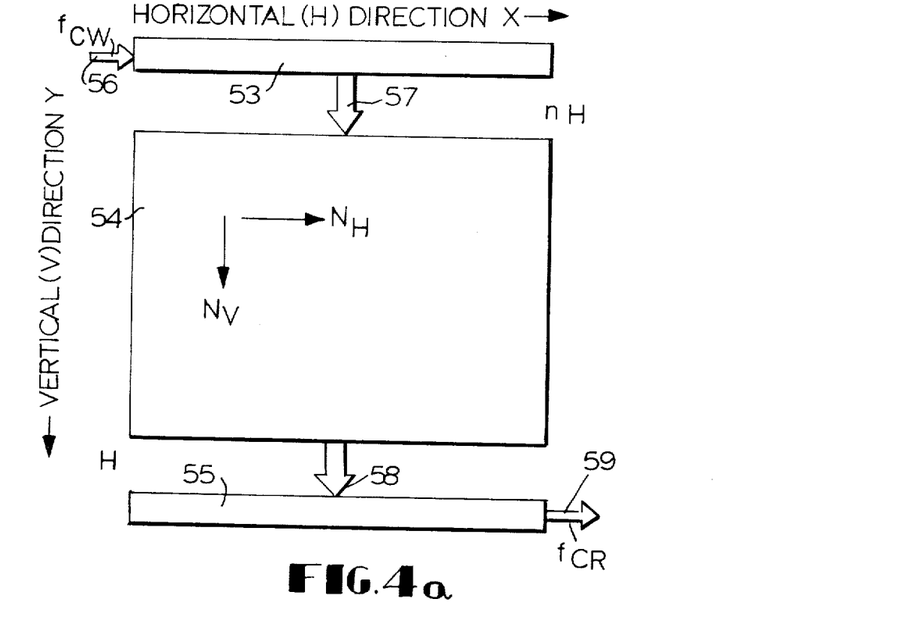
FIGS. 4a–4b illustrate the field memory configuration of a conventional TV receiver and a TV receiver in accordance with the present invention.

FIG. 4(a) shows a configuration of either of the field memories 51 or 52, which produces conventional mixed picture 3, without the effect of this invention. Reference numeral 53 is an array comprising an $N_H$ bit shift register with horizontal synchronous direction. Reference numeral 54 is an array comprising $N_H \times N_V$ pieces of the unit memories arranged in a two dimensional matrix. $N_H$ pieces of the unit memories arranged with every horizontal synchronous direction (X) are connected in common and have the function of shifting each picture element in the $N_H$ pieces in the vertical synchronous direction (Y) with the same timing. Reference number 55 is an array consisting of an $N_H$ bit shift register with horizontal synchronous direction. A writing operation 56 is performed as follows. Sampling and storing of the picture elements are repeated $N_H$ times with a writing frequency of $f_{CW}$, and $N_H$ time serial operations are completed within a horizontal synchronous interval H, and are repeated with a period equal to the interval nH.

Therefore, during the interval (n-1)H, the sampling and storing motions are not operated. Shift operation 57 transfers picture elements stored in the $N_H$ bit shift register 53 into the first row of the matrix array 54 at the same timing during a interval (n-1)H and with the period equal to the interval nH. Thus, serial operations designated by numerals 56, 57 are repeated $N_V$ times within a vertical synchronous interval V, and thereby the total image information per a vertical field, which constructs the inserted picture 5, are completely stored into the matrix array ($N_H \times N_V$) 54.

An operation designated by reference numeral 58 simultaneously shifts picture elements stored in the $N_V$-th row of the matrix array 54 into the $N_H$ bit shift register 55 during the interval H and with a period equal to the interval H.

A reading-out operation 59 from the $N_H$ bit shift register 55 is repeated $N_H$ times with a reading-out frequency of $f_{CR} = nf_{CW}$, and $N_H$ times serial operations are completed within the horizontal synchronous interval H, and are repeated with a period equal to the interval H. Thus, serial operation designated by numerals 58, 59 are repeated $N_V$ times, and thereby the total image information stored in the matrix array is completely read out.

Figure 4B:
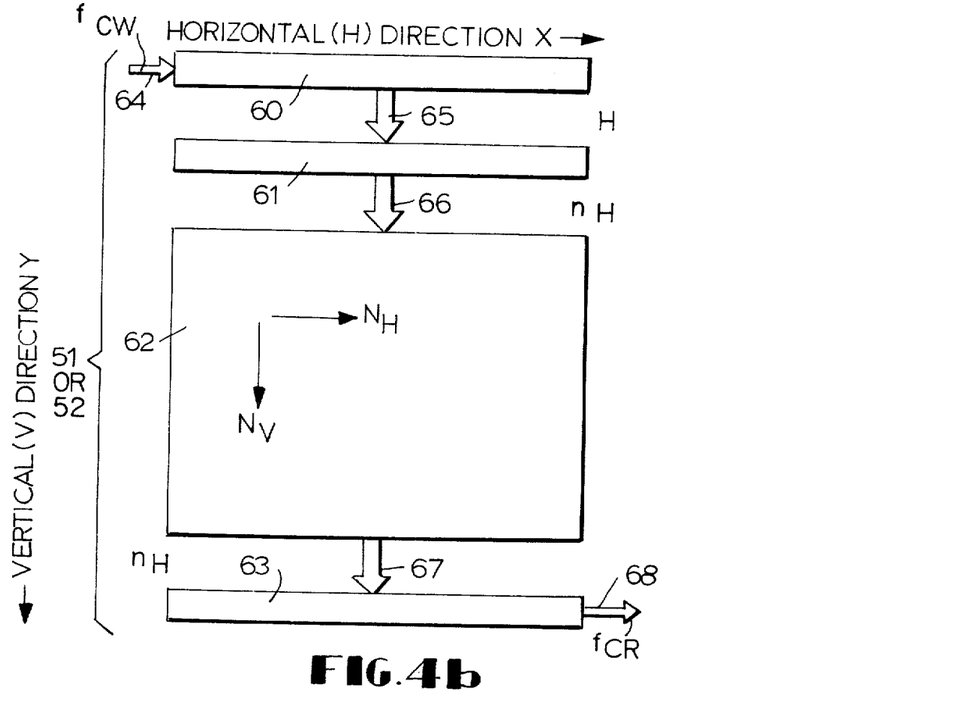

FIG. 4(b) shows a configuration of the field memories 51 or 52, which can produce the mixed picture 6 including the effect of this invention. The function of block 60 is identical to the function of block 53. The block 61 is composed of $N_H$ bit memory cells, and this block 60 is used to realize the sum and integration functions characterized by reference numerals 27 to 29. The function of block 62 is identical to the function of block 54. The function of block 63 is also identical to the function of block 55.

A writing operation 64 is processed as follows. Sampling and storing of the picture elements are repeated $N_H$ times with a writing frequency of $f_{CW}$ within a horizontal synchronous interval H and this motion is repeated with a period equal to the interval H. In other words, it is a feature of this invention that the $N_N$ bit shift register 60 is operated for every horizontal synchronous interval H. An operation designated by reference number 65 simultaneously shifts the image information stored in the $N_H$ bit shift register 60 into the $N_H$ bit memory cells 61, just after the writing operation 64 has been completed. Both the writing operation 64 and the shift operation 65 must be completed within a horizontal synchronous interval H. The sum-and-integration functions designated by reference numbers 27 to 29 are realized within the memory cells 61 by repeating such a shift operation 65 n times. An operation designated by reference number 66 simultaneously shifts the $N_H$ bit image information summed and integrated within the memory cells 61 into the first row of the matrix array 62. Thus the operations 64 and 65 are repeated $n \times N_V$ times and the operation 66 is repeated $N_V$ times within a vertical synchronous interval V, and thereby the total image information per a field, (which can construct the inserted picture 7), are completed stored into the matrix array ($N_H \times N_V$) 62. It is a matter of course that the $N_H$ bit image information stored in every row of the matrix array 62 is simultaneously shifted toward the vertical synchronous direction (Y) bit by bit in synchronism with the operation 66.

Reading out of the image information stored in the matrix array 62 is identical to the reading out operations discussed above by using FIG. 4(a). Therefore, the operation designated by reference numeral 67 corresponds to the operation 58, and the operation designated by reference numeral 68 corresponds to the operation 59.

The $N_H$ bit shift registers designated by reference numerals 60 and the 63, and memory cells 61 used to perform the functions of sum-and-integration, and the matrix array 62 can be constructed by using charge transfer devices (CTD) such as charge coupled devices (CCD) as discussed below or bucket brigade devices (BBD), and these functions can also be constructed by using digital shift registers and random access memories (RAM). It is a fundamental condition of this invention to include the functions designated by the memory cells 61 and the serial operations designated by reference numbers 64, 65, 66. An example to realize the above condition are shown in FIG. 5 by using CCD.

Figure 5:
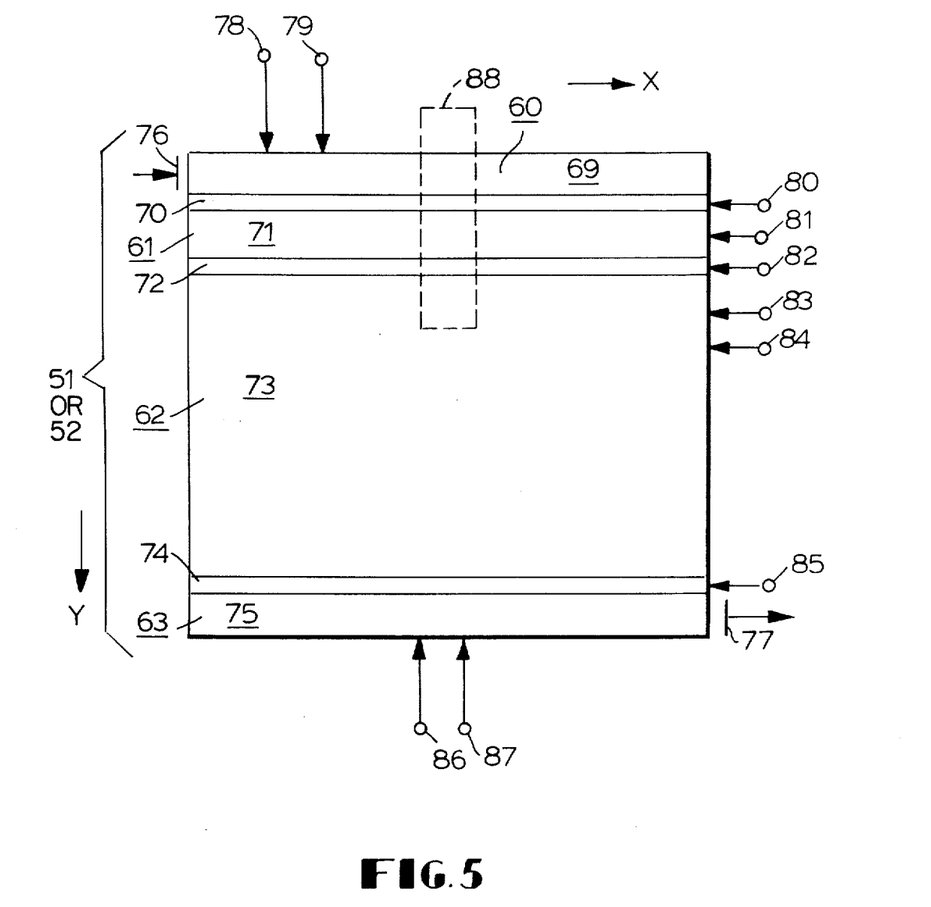
FIG. 5 is a block diagram of a portion of a TV receiver in accordance with the present invention.

In FIG. 5, block 60 is realized by using a CCD shift register of $N_H$ bits as designated by reference numeral 69. Block 61 is realized by using CCD electrode patterns of $N_H$ bits designated by reference numeral 71, which are connected in common in the X direction. CCD electrode patterns of $N_H$ bits designated by reference numbers 70 and 72, which are also connected in common in the X direction, are used respectively to realize the operations 65 and 66. The block 62 is composed of the matrix array 73 of CCD memory cells, which has a size of $N_H$ bits in the X (that is, the horizontal synchronous direction) direction and $N_V$ bits in the Y (that is, the vertical synchronous direction) direction. The CCD memory cells on each Y-th row are connected in common so that the image information within these memory cells may be simultaneously transferred in the Y direction. CCD electrode patterns of $N_H$ bits designated by reference number 74, which are also connected in common in the X direction, are used to realize the operation 67. Block 63 is realized by using a CCD shift register of $N_H$ bits as designated by reference numeral 75. The parts designated by numerals 76 and 77 are an input region of the CCD shift register 69 and an output region of the CCD shift register 75.

Figure 6:
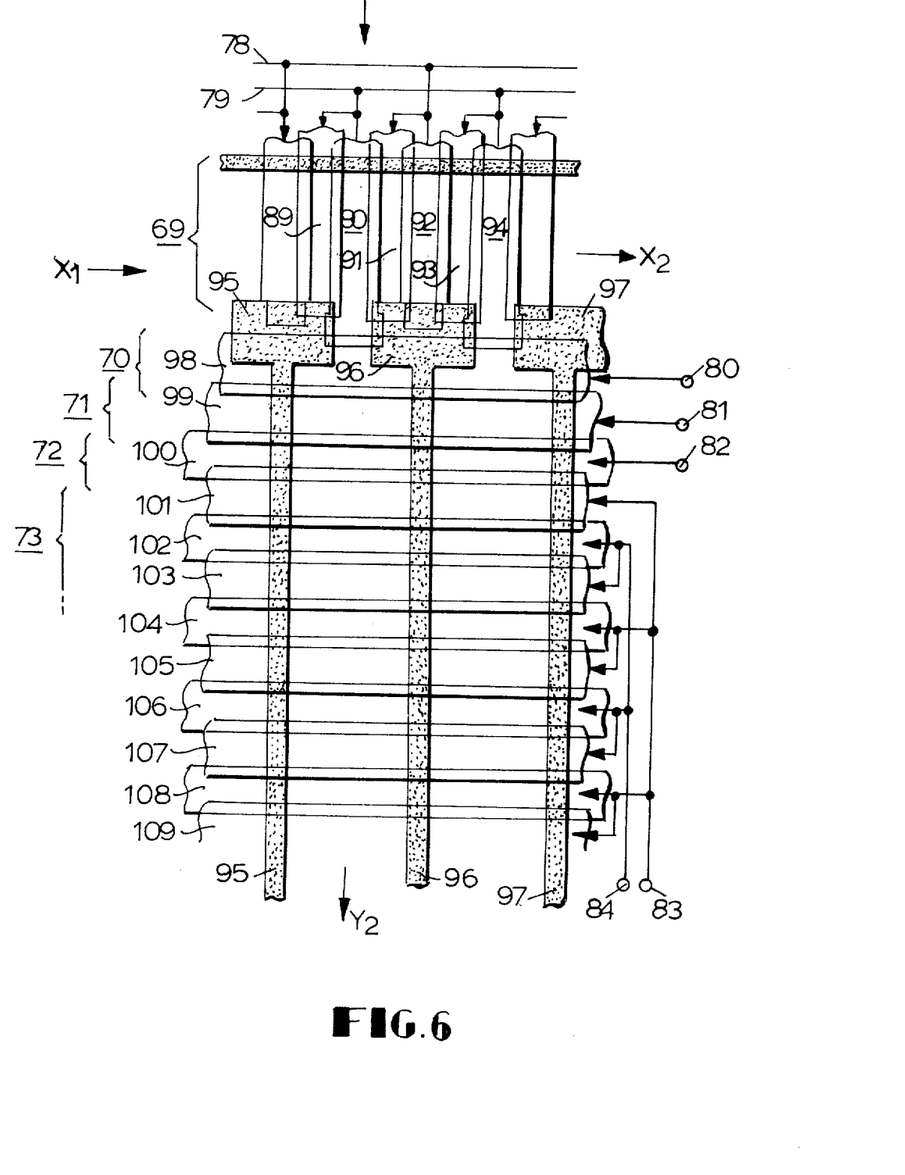
FIG. 6 shows a top view of a CCD electrode pattern of an element of the present invention.

FIG. 6 shows a top view of the CCD electrode pattern surrounded by dashed square 88.

Figure 7A:
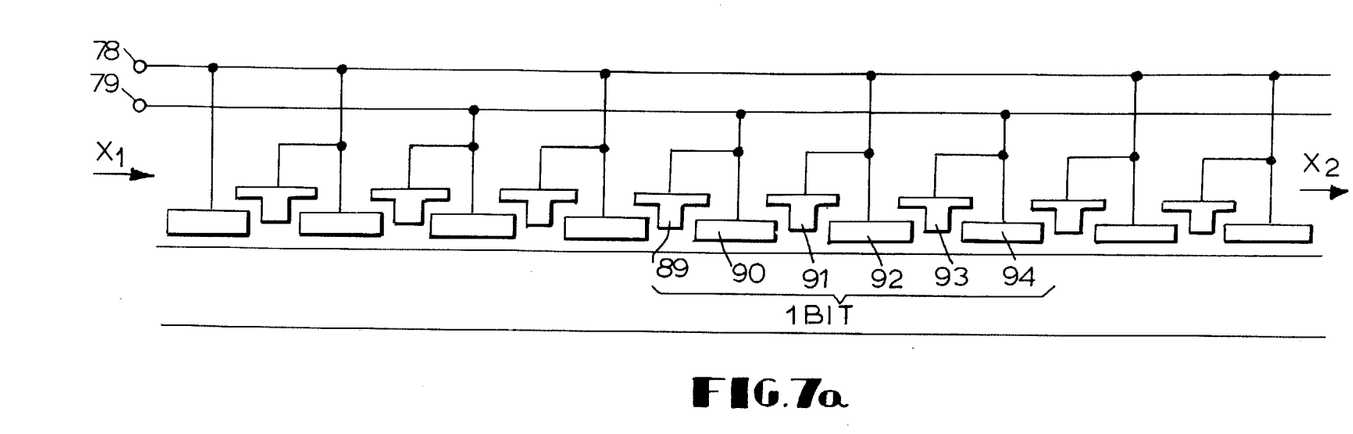
FIG. 7a–7b are cross-sectional views of the CCD device of FIG. 6, taken respectively with respect to lines $X_1$ and $X_2$ and $Y_1$ and $Y_2$.
Figure 7B:
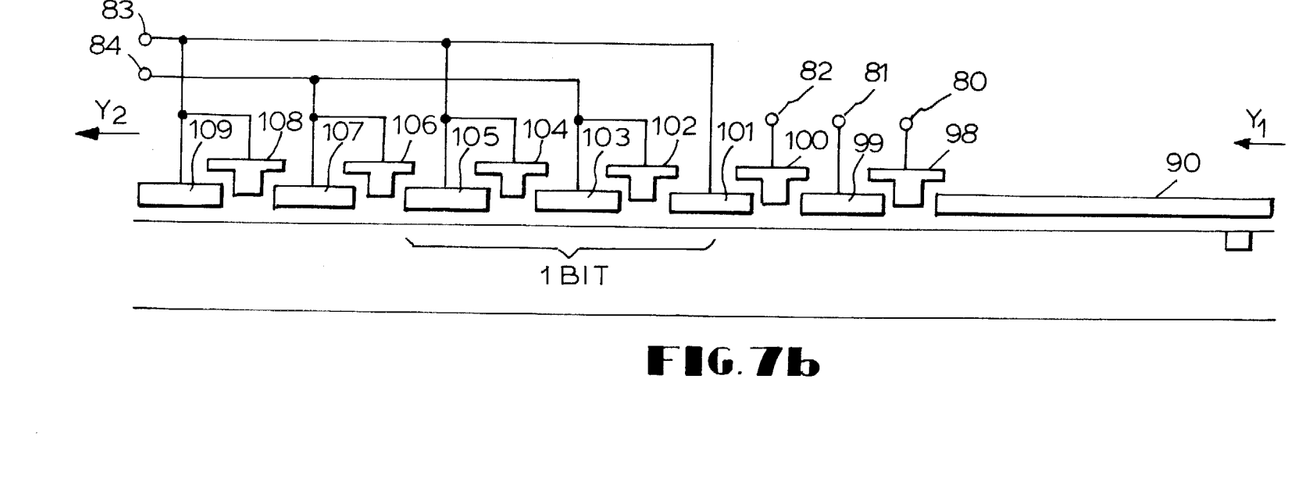

FIG. 7(a) shows a cross sectional view of the CCD shift register 69, which are cut perpendicularly to the electrode face along the line $X_1$-$X_2$ in FIG. 6. FIG. 7(b) shows a cross sectional view of CCD shift register 69, electrode patterns 70, 71, 72 and electrode patterns 73 for memory cells, which are cut perpendicularly to these electrodes faces along the direction $Y_1$-$Y_2$ in FIG. 6. A pair of electrodes patterns 89 and 90 and electrodes patterns 91 and 92 constitute memory cells of a bit for the CCD shift register 69. It is a matter of course that a pair of electrodes patterns 89 and 90 are identical to a pair of electrodes patterns 93 and 94. The patterns 95 to 97 are channel stoppers. Each set of electrode patterns separated by these channel stoppers are used to store and transfer signal charges, which correspond to an image information. A partial fraction of electrode pattern 70 corresponds to electrode pattern 98, and a partial fraction of electrode pattern 71 corresponds to the electrode pattern 99, and a partial fraction of electrode pattern 72 corresponds to electrode pattern 100. Therefore, a one bit memory cell of the matrix array of $N_H \times N_V$ corresponds to a part of electrode patterns 102, 103, 104, 105 surrounded by the channel stoppers 95 and 96.

Figures 8A, 8B, 8C:
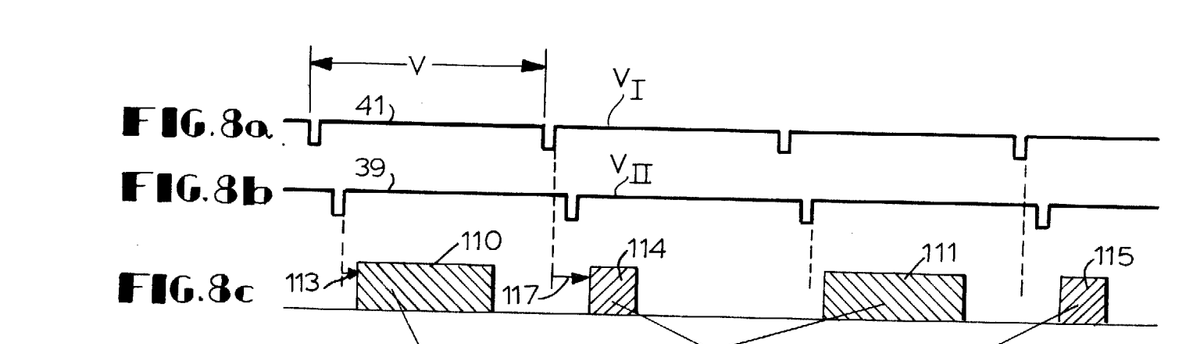
FIGS. 8a–8d and 9a–9g are timing diagrams used to facilitate the explanation of the operation of a CCD element of the present invention.
Figure 8D:
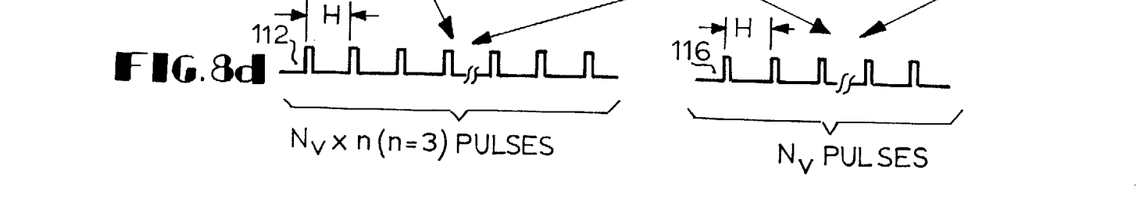
Figure 9A:
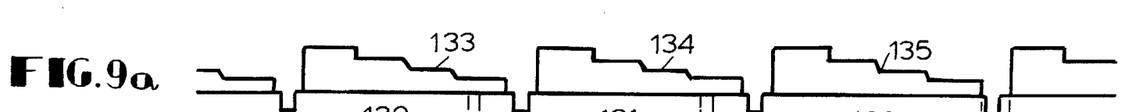
Figures 9B, 9C:
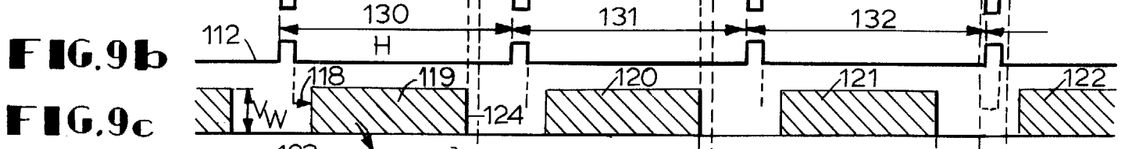
Figures 9D, 9E, 9F:
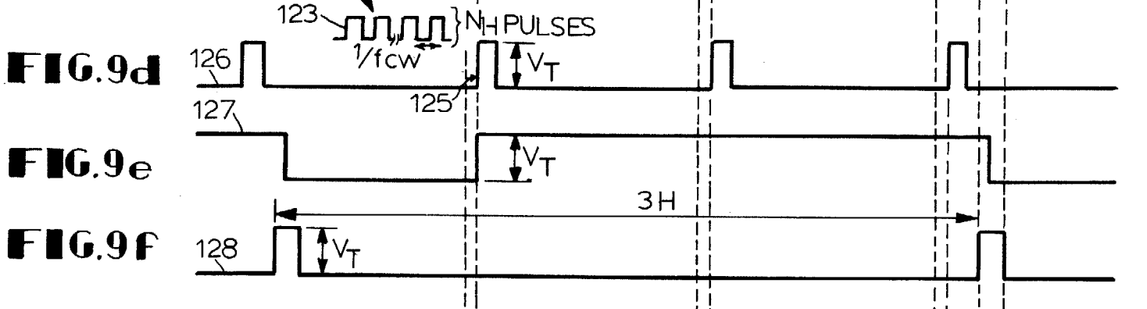
Figure 9G:
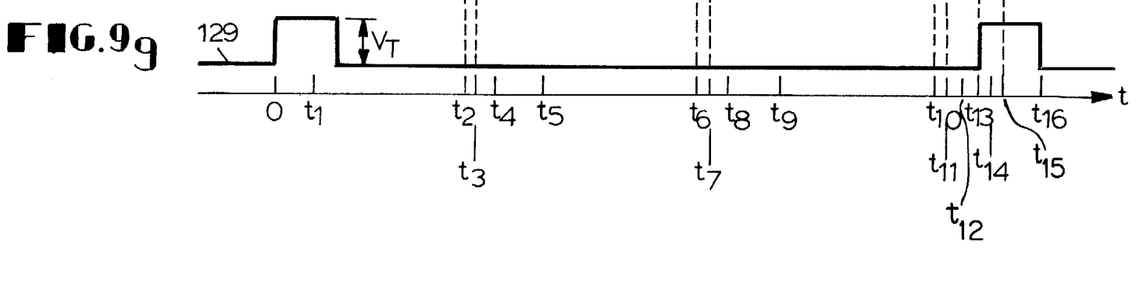
Figure 10A:
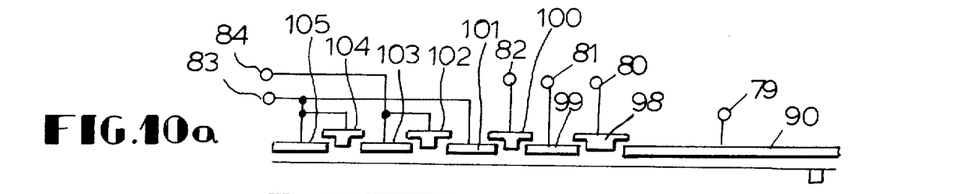
FIG. 10a is a partial cross-sectional view of a CCD device in accordance with the present invention and FIGS. 10b–10i are profiles of the surface potentials thereof.
Figure 10B:
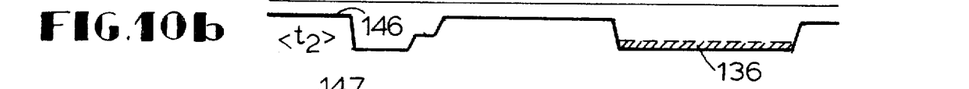
Figure 10C:
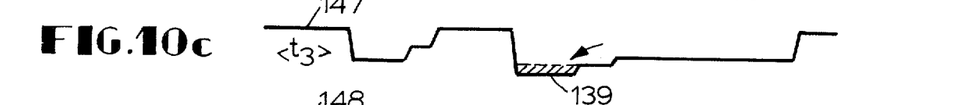
Figures 10D, 10E:
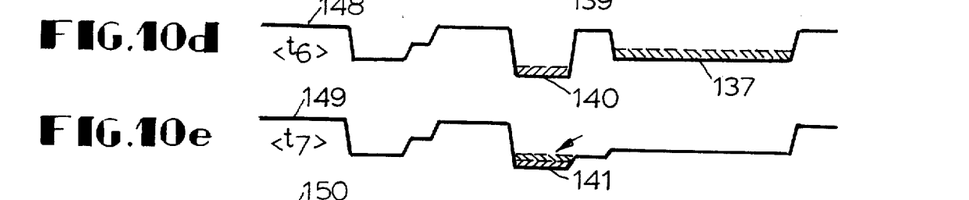
Figures 10F, 10G:
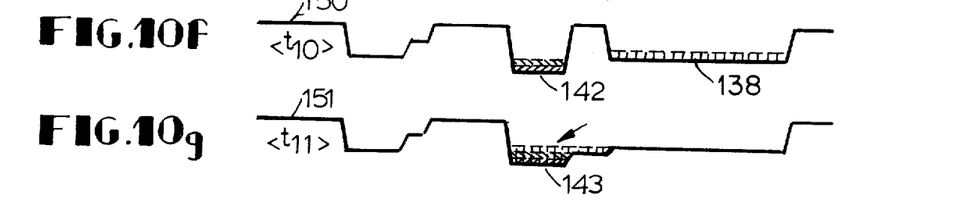
Figure 10H:
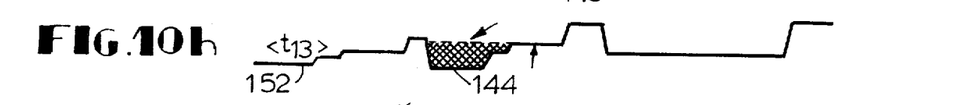
Figure 10I:
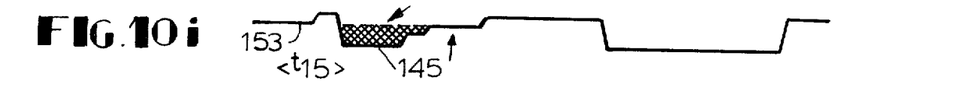

Next, the group of timing pulses designated by reference numeral 44, which are applied to the electrode patterns designated by reference numeral 89 to 109 are shown in detail in FIG. 8 and FIG. 9, and it is verified that the sum and integration operation designated by reference numerals 27 to 29, which is a basic function for this invention, can be realized by using the configuration of the electrode patterns 89 to 109 and the group of timing pulse 44.

FIG. 8 shows timing pulses to control the writing operation 64, the shift operation 65, the shift operation 67 and the reading-out operation 68. Pulses designated by re-reference numerals 41 and 39 in FIGS. 8a and 8b correspond to the vertical synchronous signals $V_I$ for channel I and $V_{II}$ for channel II respectively. Pulse systems designated by reference numerals 110 and 111, whose magnified construction are characterized by a row of pulses designated by reference numeral 112, are used to control the writing operation 64, the shift operation 65 and the shift operation 66. This row of pulses 112 are repeated $n \times N_V$ times within the period of the horizontal synchronous interval H, and these pulse systems 110 or 111 are started at delayed timing 113 triggered by the vertical signal $V_{II}$ 39 as a triggering signal. Pulse systems designated by reference numerals 114, 115, whose magnified construction are characterized by a row of pulses designated by reference numeral 116, are used to control the shift operation 67 and the reading-out operation 68. This row of pulses 116 are repeated $N_V$ times within the period of the horizontal synchronous interval H, and these pulse systems 114 or 115 are started at delayed timing 117 triggered by the vertical signal $V_I$ 41 as a triggering signal. This delayed timing 117 determines a displaying position of the inserted picture respect to the vertical synchronous direction (Y).

In FIG. 9, pulse systems designated by reference numerals 119 to 122 start to generate at the delayed timing 118 by receiving the row of pulses 112 as a triggering signal. The pulse systems 119 to 122, whose magnified construction are characterized by a row of pulses 123 repeated $N_H$ times and having a clock frequency of $f_{CW}$, are applied to the terminal 78 for operating the $N_H$ bit CCD shift register 69, and a D.C. bias voltage, which is equal to nearly half of the pulse voltage height $V_W$ of the row of pulses 123, is applied to the terminal 79. The row of pulses designated by reference numeral 126, which includes a pulse with an amplitude of $V_T$ at a delayed timing 125, are generated by receiving a building-down timing 124 for the pulse systems 119 to 112 as a triggering signal. This row of pulses 126 is applied to the terminal 80. The row of pulses designated by reference numeral 127, which repeats with a period of nH (In FIG. 9e, n=3), are generated by receiving the row of pulses 126 as an n times count pulse. This row of pulses 127 is applied to the terminal 81. Rows of pulses designated by reference numerals 128 and 129 are also generated by using same procedure for generating the row of pulses 127. These rows of pulses 128 and 129 are applied to terminal 82 and terminal 83, respectively. A D.C. bias voltage, which is equal to nearly half of the pulse voltage $V_T$ is applied to the terminal 84.

In FIGS. 10a-10i, profiles of the surface potentials designated by reference numeral 146 to 153 and the signal charges designated by reference numerals 136 to 145, which are underneath the electrode patterns 90, and 98 to 105, are shown as a function of the timing $t_1$ to $t_{16}$ determined in accordance with the time variation for the rows of pulses 126 to 129. According to the basic operation for a CCD device, image signal information is sampled and written at the time $t_1$ and storing of the image signal information is completed over the $N_H$ stages of the shift register 69 at the time $t_2$. In this case, signal charges 136, which correspond to a signal point 133 in the first horizontal synchronous interval 130, are stored underneath the electrode pattern 90 in accordance with the generation of the surface potential profile designated by reference numeral 146. At the time $t_3$, rows of pulses designated by reference numerals 126 and 127 are held to the high potential of $V_T$, and electrode pattern 98 and 99 conduct to the electrode pattern 90 in accordance with the generation of the surface potential profile designated by reference numeral 147, and so the signal charges 136 underneath the electrode pattern 90 starts to be transferred to the electrode patterns 98 and 99. The transferred signal charges are designated by reference numeral 139. For the purpose of conducting such a transfer smoothly, the value of $V_T$ is chosen to be higher than the value of $V_W$. At the time $t_4$, the row of pulses 126 is switched to a zero potential, and the signal charges 139 start to be stored and separated from the conducting channel underneath electrode pattern 90. In the following stage, at the time $t_5$, image signal information start to be sampled and transferred by the pulse system 120, and storing of the signal information is completed over the $N_H$ stages of the shift register 69 at the time $t_6$. In such case, signal charges 137, which correspond to a signal point 134 in the second horizontal synchronous interval 131, are stored underneath the electrode pattern 90, in accordance with the generation of the surface potential profile designated by reference numeral 148. At the time $t_7$, the row of pulses 126 is again switched to the high potential of $V_T$, and the electrode pattern 98 and the electrode pattern 99 conduct to the electrode pattern 90 in accordance with the generation of the surface potential profile designated by reference numeral 149, and so the signal charges 137 underneath the electrode pattern 90 are mixed with the signal charges 140, which are stored for the signal charges 139. Such a mixed state for the signal charges correspond to the signal charges designated by reference numeral 141. At the time $t_8$, the row of pulses 126 is switched to a zero potential, and the signal charges 141 start to be stored and separated from the conducting channel underneath electrode pattern 90. Next, at the time $t_9$, image signal information start to be sampled and transferred by the pulse system 121, and storing of the signal information is completed over the $N_H$ stages of the shift register 69 at the time $t_{10}$. In this case, signal charges 138, which correspond to a signal point 135 in the third horizontal synchronous interval 132, are stored underneath the electrode pattern 90 in accordance with the generation of the surface potential profile designated by reference numeral 150. At the time $t_{11}$, the row of pulses 126 is again switched to the high potential of $V_T$, and the electrode pattern 98 and the electrode pattern 99 conduct to the electrode pattern 90 in accordance with the generation of the surface potential profile designated by reference numeral 151, and so the signal charges 138 underneath the electrode pattern 90 are mixed with the signal charges 142, which are stored for the signal charges 141. Such a mixed state for the signal charges makes the signal charges designated by reference numeral 143. Thus, signal charges 143, which are the summed and integrated result for three different signal charges 136, 137 and 138 over three horizontal synchronous intervals (3H), are stationarily stored underneath the electrode pattern 99, as the row of pulses 126 is switched to zero potential at time $t_{12}$.

At the time $t_{13}$, the rows of pulses 128 and 129 are switched to the high potential of $V_T$, the signal charges 143 are transferred to the electrode pattern 101 through the potential barrier for the electrode pattern 100, in accordance with the generation of the surface potential profile designated by reference numeral 152. Such a transferred state corresponds to the signal charges designated by reference numeral 144. At the same time with the timing $t_{13}$, if any signal charges have been stored underneath the electrode patterns 102 and 103, the signal charges can be transferred to the electrode patterns 106 and 107, through the conducted potential barrier under the electrode patterns 103 and 104. At the time $t_{14}$, row of pulses 127 is switched to zero potential, and subsequently at the time $t_{15}$, the row of pulses 128 is switched to a zero potential, and finally at the time $t_{16}$, the row of pulses 129 is switched to a zero potential, so that the summed and integrated signal charges 144 are transferred to the electrode patterns 102 and 103, which are biased to a D.C. potential of $V_t/2$ in accordance with the generation of the surface potential profile designated by reference numeral 153. Thus, the transferred state corresponds to the signal charges designated by reference numeral 145. The summed and integrated charges 145 are stationarily stored underneath the electrode patterns 103 and 102 during the time interval between the time $t_{16}$ and the next coming building-up time for the row of pulses 129, that is the kind of time characterized by the time periods 0 or $t_{13}$, and are transferred to the electrode patterns 106 and 107 through the conducted barrier underneath the electrode patterns 104 and 106 at the time when the row of pulses 129 is again switched to the potential $V_T$. It is noted that the next sum and integration operation starts at the time denoted by $t_1'$.

In this way, a series of operations characterized by the time $t_1, T_2, \ldots t_{16}$ enable the system to realize the sum and integration operation. By repeating such a series of operations $N_V$ times within a period equal to the interval nH (n=3, in FIGS. 10a–10i), the total image information to construct the picture can be completed.

What is claimed is:

1. A television receiver comprising: television signal receiving means for simultaneously receiving two television signals to produce a first image signal and a second image signal corresponding to said television signals, respectively, each of which contains vertical synchronous signals and horizontal synchronous signals; synchronous signal producing means operatively coupled to said television signal receiving means for producing the vertical synchronous signals and the horizontal synchronous signals from said first and second image signals; memory means operatively coupled to said television signal receiving means for sampling and storing said second image signal; driving pulse producing means operatively coupled to said synchronous signal producing means and to said memory means for producing driving pulses to drive said memory means in accordance with said vertical synchronous signals and said horizontal synchronous signals applied thereto; mixing means operatively coupled to said television signal producing means and to said memory means for producing a mixed image signal composed of said first image signal having a portion of which replaced, under the control of said driving pulses, by said second signal read out from said memory means by said driving pulses; and display means operatively coupled to said mixing means for displaying said mixed image signal on a television screen, wherein: each horizontal synchronous period of said second image signal is sampled by said memory means into $N_H$ sampled signals, $N_H$ geing an integer; M horizontal synchronous periods of said second image signal are sequentially grouped into M/n sequential groups, each group consisting of n horizontal synchronous periods, M and n being integers, and $M>n$; and n sampled signals which are sampled by said memory means from each of said group of n adjacent horizontal synchronous periods of said second image signal, respectively, and which correspond to each other in the vertical direction on the television screen are summed and integrated into one sampled image signal element, whereby $N_H$ such sampled image signal elements for each horizontal synchronous period of the second image signal in said mixed image signal are formed from $n \times N_H$ sampled signals of each of said group of n adjacent horizontal synchronous periods of said second image signal and stored by said memory means.

2. A television receiver according to claim 1, in which said memory means comprises a first set of $N_H$ charge transfer devices, a third set of $N_H \times N_v$ charge transfer devices, a fourth set of $N_H$ charge transfer devices, a fifth set of $N_H$ charge transfer devices and a sixth set of $N_H \times N_v$ charge transfer devices, $N_v$ being equal to M/(2n) and which equals the number of horizontal synchronous periods of one field of said second image signal in said mixed image signal, wherein: for a first field of one frame of said second image signal from said television signal receiving means, each horizontal synchronous period of said second image signal is sampled by said first set of charge transfer devices into said $N_H$ sampled signal; the n sampled signals which are sampled by said first set of devices from each of said group of n adjacent horizontal synchronous periods of said second image signals, respectively, and which correspond to each other in said vertical direction are summed and integrated into said one sampled image signal element by each corresponding one of said $N_H$ charge transfer devices of said second set of devices; and said $N_H$ such sampled image signal elements are stored in corresponding $N_H$ charge transfer devices of said third set of devices, and wherein: for a second field of said one frame of said second image signal from said television signal receiving means, the sampling operation, the summing-integrating operation and the storing operation are the same as those performed by said first set, second set and third set of devices for said first field, respectively, and are performed by said fourth set, fifth set and sixth set of devices, respectively.

3. A television receiver according to claim 2, wherein each of said charge transfer devices is a charge coupled device.

* * * * *